United States Patent Office 3,386,882
Patented June 4, 1968

3,386,882
PURIFIED VACCINE FROM BRAIN TISSUE
Carl M. Eklund and Leo A. Thomas, Hamilton, Mont., assignors to the United States of America as represented by the Secretary of the Department of Health, Education, and Welfare
No Drawing. Filed July 22, 1964, Ser. No. 384,556
3 Claims. (Cl. 167—78)

The invention described herein may be manufactured and used by or for the government for governmental purposes without the payment of any royalty thereon in accordance with the provisions of the act of Apr. 30, 1928 (Ch. 460, 45 Stat. L. 467).

Immunization against many viral infections of medical importance has relied upon vaccine prepared from brain tissue. Use of such vaccine has proceeded with great caution because of the possibility of inducing allergic encephalomyelitis particularly when the vaccines have been prepared from adult mouse and rat brains. This risk has been widely recognized as a result of the antirabic vaccination practice. Certain investigators have thought that such complications do not develop if brains of newborn animals, containing no myelin, are used in preparation of the vaccine. (Svet-Moldavsky, G. J., Svet-Moldavakaya, I. A., and Kiseleva, I. S., Acta Virol. 4:320, 1960.) Prevention of tick-borne encephalitis by vaccination with formalized killed vaccine prepared from infected brains of newborn white mice and rats, using 5% suspensions of brains in saline with the addition of formalin in the ratio of 1:500 has been reported. (V. I. Ilyenko, Acta virol. 6:187, 1962.) However, although much less of the allergenic substance is found in the brain of suckling mice or rats than in the adult brain, it is still present in small amounts. We have found that while no allergic encephalomyelitis may develop on first injection of a crude suspension of suckling mouse tissue, there is a high incidence of allergic encephalomyelitis on a second injection. We have developed a method for the purification of the infected brain tissue of the suckling mouse, which enables us to prepare a vaccine free from significant allergic encephalomyelitis inducers.

It is the object of our invention to prepare from infected brain tissue a vaccine free from the possibility of induction of allergic encephalomyelitis when a series of inoculations is given. The method described herein reduced the amount of protein in the vaccine with no significant loss in infectivity. It further reduces the required amount of preservative. This method may serve as a prototype for the preparation from brain tissue of vaccines for tick-borne virus diseases, [Langot (TP-21), Colorado Tick Fever (CTF), Eastern equine encephalitis (EEE), Western Equine Encepholitis (WEE)], and possibly other viral diseases.

The preparation of Colorado tick fever vaccine has been selected as a specific example.

Virus.—The Florio strain of CTF virus was used. This strain, originally isolated from a patient, had undergone 30 passages in hamsters and approximately 60 passages in suckling mice. $LD_{50}$ titers of $10^{-8.5}$ to $10^{-9.5}$, based on weight of original mouse brain, were obtained in 4-day-old mice by both the intracerebral (I.C.) and intraperitoneal (I.P.) routes of inoculation; respective $LD_{50}$ titers in 21-day-old mice were $10^{-8.0}$ and $10^{-9.0}$.

Animals.—The Rocky Mountain Laboratory (RML) strain of Swiss albino mice and the Hartley strain of guinea pigs were employed in the preparation and testing of vaccines.

Preparation of vaccine and source of virus.—Suckling mouse brain was used as the source of virus. Four-day-old mice were inoculated (I.C.) with 0.02 ml. of a $10^{-2}$ dilution of stock virus. Brain tissue was harvested from survivors when about 10% of the mice had died, which was usually on the 3rd day postinoculation. First, mice were exsanguinated by cutting into the chest cavity; hair and skin of the head was wet with 70% alcohol, and the skin over the skull was removed. The brain was aspirated with a 13-gauge hypodermic needle. Brain tissue was stored in sealed glass tubes at —76° C.

Preparation of calcium phosphate.—Calcium phosphate was prepared by pouring 0.5 M $CaCl_2$ into an equal volume of 0.5 M $Na_2HPO_4$. The resulting precipitate (calcium phosphate) was washed three times by centrifugation in 0.001 M phosphate buffer, pH 7.0. Following the third wash, it was allowed to settle at room temperature in a graduated cylinder. The volume of precipitate was determined after the supernate was decanted. Calcium phosphate was prepared at least one day before use. Maximum time of storage was not determined.

Purification.—A modification of an earlier described method was employed. (Smith, C. E. G., and Holt, D., 1961. Chromatography of arthropod-borne viruses on calcium phosphate columns. Bull, World Health Organs, 24:749–759.)

(a) A 10% suspension (w./v.) of infected suckling mouse brain in 0.05 M $Na_2HPO_4$ was prepared by emulsification in a Waring Blendor (one to two minutes), followed by centrifugation under controlled conditions (10 minutes, 450 g., 4° C.) to remove coarse particles. The supernate was designated as "Original."

(b) An equal volume of calcium phosphate precipitate was added to the "Original" and the mixture shaken one to two minutes in 250 ml. centrifuge bottles. This was followed by centrifugation (10 minutes, 450 g., 4° C.). The resulting supernate was designated as the "Slurry" fraction.

(c) The sediment in (b) was resuspended in a volume of 0.1 M buffered $Na_2HPO_4$ equal to that of "Original" and the centrifugation repeated as described in (b). (The phosphate solutions used for elution were adjusted to pH 9.0 with borate buffer.) The resulting supernate was designated as the "0.1 M" fraction. This process was repeated with 0.2 M, 0.3 M, 0.4 M, and 0.5 M buffered $Na_2HPO_4$ on each sediment to elute virus. The same method of designating supernate was used for these fractions.

(d) Each supernate was centrifuged a second time (10 minutes, 450 g., 4° C.) to remove any coarse particles that may have been transferred during decanting.

(e) Some of the supernates were passed through glass filters of medium and fine porosity and these were designated as "glass filtered."

Inactivation.—Formaldehyde solution (USP) was added to most supernates to give a final concentration of 1:2200 formalin (or $1.8 \times 10^{-4}$ g. $CH_2O$/ml.). The preparations were stored at 4° C. for inactivation of virus and preservation.

Infectivity.—Successive tests were run to determine persistence of live virus. When no live virus was detected in two successive tests, mice were inoculated for immunogenicity tests.

Protection.—Immunogenicity was tested in mice. Twenty-one-day-old mice were given two injections (0.5 ml., I.P.) of undiluted or of a 1:2 dilution of vaccine 1 week apart and challenged with serial 10-fold dilutions of stock CTF virus, 0.2 ml., I.C., 2 weeks following the second injection.

Neutralization.—A few mice were exsanguinated 2 weeks after the second injection and the serum was tested for virus-neutralizing properties. Serial dilutions of CTF virus and equal parts of undiluted serum were incubated 1 hour at 37° C. in a water bath and inoculated into 21-day-old mice (0.02 ml., I.C.).

Normal mice of the same age as vaccinated mice were used as controls in each of the above tests. Mice were observed for two weeks before tests were completed and $LD_{50}$ titers were calculated.

Results of infectivity tests on the 0.2 M vaccine show that virus was detected on day 3 and possibly on day 4 but not on days 7 and 20.

Virus and protein content.—Data on virus titers and protein content of various fractions of representative lots of vaccine show that approximately 90% of the protein had been removed when the 0.2 M fractions were compared to the "Originals," while there was no significant loss in infectivity. The 0.2 M eluate was chosen for the preparation of vaccine on the basis of preliminary studies which showed that infectivity was generally higher in that fraction, even though the protein content was approximately 10% of the original.

Allergic encephalomyelitic activity. — No allergic encephalomyelitis was observed in guinea pigs after the 1st injection of the 0.2 M or 0.3 M fractions of vaccine, or a crude suspension of suckling mouse brain tissue; however, 80% of the animals that received a crude suspension of adult mouse brain tissue, and all 10 that received a crude suspension of adult guinea pig brain tissue developed typical clinical signs of allergic encephalomyelitis which usually terminated in death. The response following the second challenge 2 months later was particularly interesting. All animals that received suckling mouse brain tissue developed allergic encephalomyelitis and half of them died.

Only 20% of the mice that received the 0.2 M fraction of vaccine showed any allergic encephalomyelitis reaction. Recovery followed in all cases.

Immunogenicity in mice.—Five lots of 0.2 M fractions were tested in mice to determine the consistency of protection. Significant protection was demonstrated in all groups. Protection against one million adult mouse I.C. $LD_{50}$ or challenge virus was demonstrated in 3 of 5 groups and against at least 100,000 adult mouse I.C. $LD_{50}$ with another lot.

Sterility and infectivity.—Vaccines were not tested for immunogenicity until sterility and infectivity tests were negative. Virus was usually inactivated in a week or less in preparations treated with formalin in a final concentration of 1:2200. Such usual tests for potency, sterility and infectivity were carried out before use in human volunteers.

Protein and nitrogen content.—Total protein was determined spectrophotometrically and total nitrogen by micro-Kjeldahl.

Allergic encephalitis response.—Fractions of vaccine (0.2 M) were tested for allergic encephalitic activity.

Immunogenicity in man.—After the 0.2 M vaccines had been tested with no untoward reactions in a few volunteers at the Rocky Mountain Laboratory, Hamilton, Mont. (RML), further tests were made in volunteers at the Montana State Prison, Deer Lodge, Mont. Inmates were skin tested by intradermal injection of 0.1 ml. of 1:10 dilution of vaccine. Skin tests were read at 24 and/or 48 hours to determine occurrence and size of erythema and induration. The basic schedule of vaccination consisted of two doses of either 0.5 or 1.0 ml. of undiluted vaccine given subcutaneously a month apart. Some individuals also received a third dose 6 months after the second vaccination. Sera were collected at various intervals and tested for presence of neutralizing antibodies.

Skin tests in man.—The extent of induration 24 hours after initial and 2nd injections of vaccine was studied. Nearly all persons showed some skin sensitivity after vaccination. There was, however, no significant increase in sensitivity to the second dose as compared to the first dose of vaccine.

The skin reaction was due to sensitization to the viral components of the vaccine per se.

Antigencity in man.—Significant titers of antibody were present in all cases after two months. After eight months less than half had significant antibody titers. Some persons received a third inoculation and all had significant antibody titers one month later.

We claim as our invention:

1. In a process of preparing a vaccine by freeing an arbovirus from secondary encephalomyelitis virus impurities by adsorbing said arbovirus on calcium phosphate, selectively eluting said arbovirus with sodium phosphate ($Na_2HPO_4$) solution and subsequently recovering purified arbovirus, and killing said purified arbovirus to produce a killer arbovirus and adding a carrier to produce a vaccine, the step which comprises selectively eluting a CTF arbovirus with about 0.2 M sodium phosphate ($Na_2HPO_4$) eluant.

2. A CTF killed vaccine produced by the method of claim 1.

3. The process of claim 1 wherein the arbovirus is derived from a suckling mouse brain tissue host.

References Cited

Smith et al.: Bull. World Health Organization, vol. 24, pp. 749–759, 1961.

RICHARD L. HUFF, *Primary Examiner.*

ELBERT L. ROBERTS, LEWIS GOTTS, *Examiners.*